(12) United States Patent
Breu

(10) Patent No.: US 11,197,155 B2
(45) Date of Patent: Dec. 7, 2021

(54) DISTRIBUTED LEDGER VERIFICATION SYSTEM USING PROOF-OF-LIFE

(71) Applicant: PayPal, Inc., San Jose, CA (US)

(72) Inventor: Lorenz Breu, Palo Alto, CA (US)

(73) Assignee: PayPal, Inc., San Jose, CA (US)

( * ) Notice: Subject to any disclaimer, the term of this patent is extended or adjusted under 35 U.S.C. 154(b) by 2 days.

(21) Appl. No.: 15/857,117

(22) Filed: Dec. 28, 2017

(65) Prior Publication Data

US 2019/0208418 A1 Jul. 4, 2019

(51) Int. Cl.
| | |
|---|---|
| *H04W 12/06* | (2021.01) |
| *G06F 21/32* | (2013.01) |
| *H04L 29/06* | (2006.01) |
| *G06Q 20/36* | (2012.01) |
| *G06F 16/27* | (2019.01) |
| *H04W 12/68* | (2021.01) |

(52) U.S. Cl.
CPC ............ *H04W 12/06* (2013.01); *G06F 16/27* (2019.01); *G06F 21/32* (2013.01); *G06Q 20/3678* (2013.01); *H04L 63/08* (2013.01); *H04L 63/0861* (2013.01); *H04W 12/68* (2021.01); *G06F 2221/2133* (2013.01); *G06F 2221/2139* (2013.01); *G06Q 2220/10* (2013.01); *H04L 2209/38* (2013.01)

(58) Field of Classification Search
CPC . H04L 63/0861; H04L 63/0807; H04L 63/08; H04L 63/083; H04L 63/12; H04L 9/3239; H04L 9/3247; H04L 9/3236; H04L 9/3231; H04L 9/3213; H04L 2209/38; H04L 9/0637; H04W 12/06; H04W 12/00508; H04W 12/00503; G06F 16/27; G06F 21/32; G06F 3/017; G06F 21/602; G06F 2221/2133; G06F 2221/2139; G06Q 20/3678; G06Q 2220/10; G01C 21/28

See application file for complete search history.

(56) References Cited

U.S. PATENT DOCUMENTS

| | | | | |
|---|---|---|---|---|
| 2007/0233832 | A1* | 10/2007 | Narayanan | ............ H04L 67/104 709/223 |
| 2013/0073254 | A1* | 3/2013 | Yuen | .................... A61B 5/0002 702/160 |
| 2018/0314684 | A1* | 11/2018 | Johnson, Jr. | ............ G10L 25/63 |
| 2019/0158487 | A1* | 5/2019 | Hayes | ................. H04L 63/0807 |
| 2019/0253258 | A1* | 8/2019 | Thekadath | .......... G06F 16/2228 |

\* cited by examiner

*Primary Examiner* — Kevin Bechtel
*Assistant Examiner* — Sangseok Park
(74) *Attorney, Agent, or Firm* — Kowert, Hood, Munyon, Rankin & Goetzel, P.C.

(57) ABSTRACT

A system and method of verifying a user for participation in a block chain of a distributed network. The method includes receiving, by one or more validation devices of the distributed network, a request for participation in adding transaction records to the block chain, the request being received from a mobile communication device of the user and including behavioral data collected by the mobile communication device. In response to determining that the behavioral data satisfies a human characteristic threshold, determining that the behavioral data is not associated with another device of the distributed network. In response to both those conditions above, verifying the user and enabling the user to participate in the block chain distributed network by adding a block including transaction records to the block chain via the mobile communication device.

20 Claims, 7 Drawing Sheets

DISTRIBUTED LEDGER VERIFICATION SYSTEM USING PROOF-OF-LIFE

FIELD

The embodiments discussed herein are related to a distributed ledger verification system that uses proof of life.

BACKGROUND

With the increase of electronic banking transactions, there is an increased demand for distributed systems which are able to more easily and securely monitor and record the number of transactions. One option which has recently become more widely used is through the use of a distributed block chain computer system that includes multiple computing nodes which are each configured to store a copy, or a portion thereof, of a block chain which records various transactions as blocks in the block chain, each of which contains a hash pointer as a link to a previous block, a timestamp, and transaction data. By design, block chains are resistant to modification to the data and utilize the peer-to-peer nature of a distributed network for validating new blocks.

Block chains are open, distributed ledgers that record transactions between two parties efficiently and in a way so as to be verified by multiple parties and is designed to be permanent. In order to ensure the security of the block chain and to promote consensus among the ledger stored by the computing nodes of the system, typical distributed ledger systems often utilize a "proof-of-work" system, which adds artificial computational difficulty to the ledger so that recording transactions to the ledger or block chain requires a level of difficulty. Under these "proof-of-work" systems, the computing nodes of the system act as miners that use processing power to attempt to find a target hash for a transaction. Once a valid hash is found, it is broadcast to the network of computing nodes, and a block is added to the block chain.

One problem with the proof-of-work system, however, is that it is, by design, computationally expensive and may incentivize users to obtain computing nodes with improved processing power, such as super computers, since this increases the user's odds of identifying the target hash. Systems which utilize proof-of-work are thus inherently inefficient and are a drain on processing power and battery life on computing devices and as such may deter users from participating in the distributed ledger. By creating a mining environment where a relatively few number of minors control the majority of the computing power on the network, proof-of-work systems are more susceptible to "51% attacks," where an attacker or group of attackers controlling the majority of the computing power can prevent other miners from completing blocks and allow the attackers to monopolize the mining of new blocks, reverse transactions and make it appear although they still had the coin they just spent using a vulnerability known as "double-spending." As such, there is a need for a distributed ledger verification system which is more computationally efficient and which incentivizes a greater number of users to participate as computing nodes of the system.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments of the present disclosure provide systems and methods for authentication of a user for participation in a distributed ledger system. The distributed ledger system may be used in association with, for example, a financial account, a website, and/or any other secure financial transaction system known in the art. The ledger may be provided as part of a crypto currency ledger or other distributed ledger used in authenticating financial transactions. The systems and methods described herein allow for the authentication of users for participation as "miners" who are able to record subsequent blocks of the block chain of the distributed ledger system. In some embodiments, the authentication may be performed by a system provider. In other embodiments, the authentication may be performed by other, previously authenticated computing devices connected to the distributed ledger system.

The authentication described herein includes the ability to use behavioral information stored and/or collected by a user's mobile device to confirm that the user exhibits human behavior. This behavioral behavior is used as a unique identifying feature of a user desiring to participate as a miner of the block chain and, as is described more fully below, is used to authenticate the user as a participant or miner of the block chain.

By using the behavioral data collected or stored with a user's mobile device, the system and method described herein are able to replace the traditional "proof-of-work" system with a "proof-of-life" configuration where each device is associated with the unique human behavior of a single user. Such systems and methods provide various advantages, such as reducing the computer processing power required to be a miner or participant in the distributed ledger system which encourages more users to use the system. Furthermore, the system and methods described herein are also able to ensure that each user is only able to participate as a single miner in a one-to-one ratio, which helps prevent 51% attacks since no single user is able to control a disproportionate amount of processing power of the system. Consequently, the systems and methods described herein offer a more robust and efficient system than is currently available.

Figure 1:
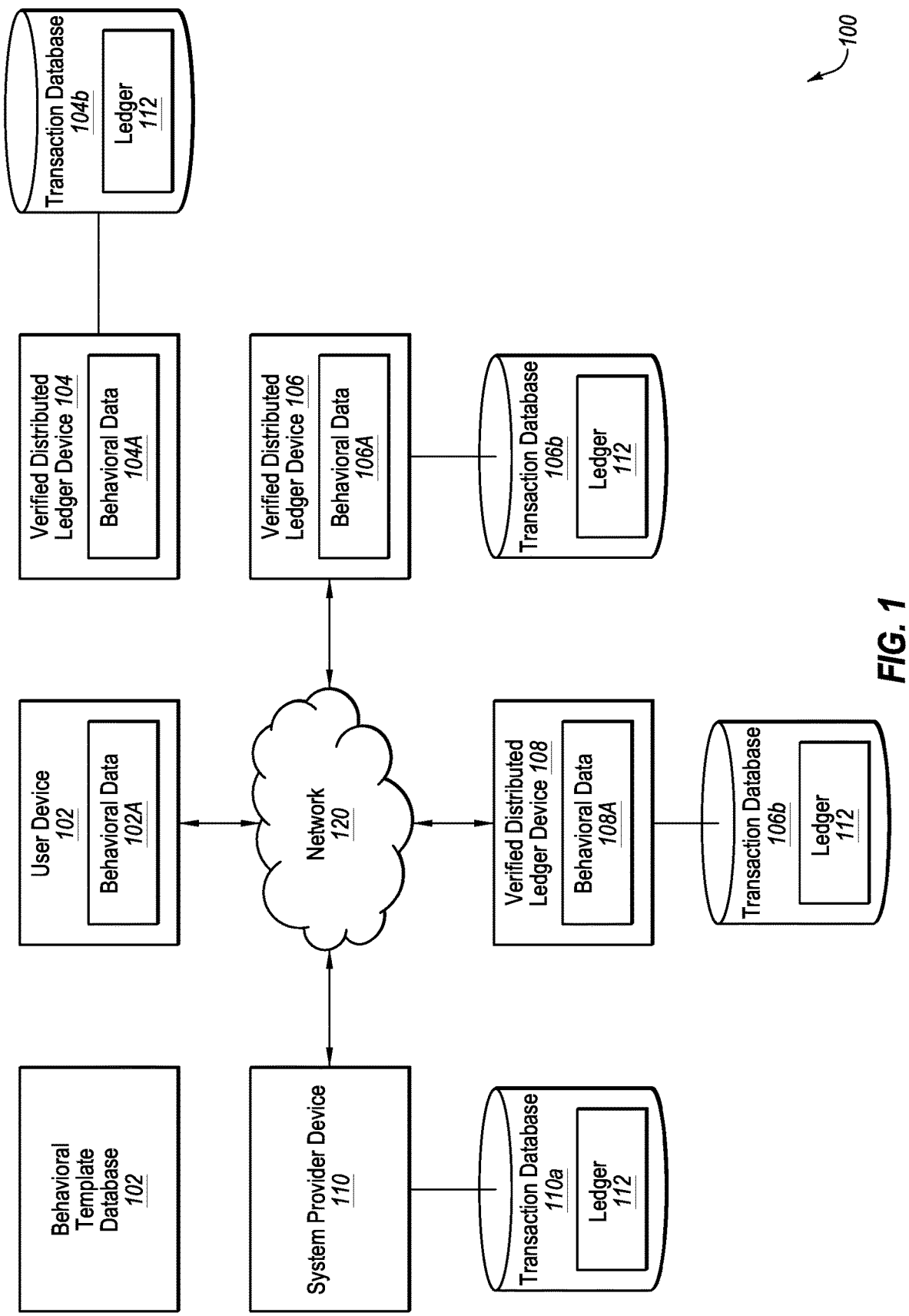
FIG. 1 is a schematic view illustrating an embodiment of a distributed ledger system according to some embodiments of the present disclosure.

Referring now to FIG. 1, which is a block diagram illustrating a distributed network system or "system" 100 for authenticating a user of a mobile device 102 for participation as a miner in the block chain of a distributed ledger 112 of the system 100. The blockchain shown herein is a part of a decentralized and distributed digital ledger 112 that is used to record transactions across many computers so that the record cannot be altered retroactively without the alteration of all subsequent blocks and the collusion of the network. As is described more fully below, the blocks of the blockchain hold batches of valid transactions which are hashed and encoded into a Merkle tree, where each block includes the hash of the prior block in the blockchain, linking the two. The linked blocks form a chain. This iterative process confirms the integrity of the previous block, all the way back to the original genesis block such that it creates a secure ledger 112 that keeps a record of all the transactions of the system without enabling modification. In addition, despite the distributed nature of a blockchain, blockchains can be quickly added by all the devices or nodes of the system. Hence, the system 100 described herein includes a distributed ledger 112 which allows the participants to verify and audit transactions of the ledger 112 inexpensively and ensures the integrity of the system 100.

In the illustrated embodiment, a number of verified distributed ledger devices or "devices" 104, 106, and 108 act as nodes of the system 100 which are connected via a network 120 to one or more system provider(s) 110, which also acts as a node of the system. The devices 104, 106, 108, and 110, devices may operate in association to perform or enable the method 300 described below with respect to FIG. 3. For example, a distributed group of devices 104, 106, 108 may operate to maintain the ledger 112 in a series of distributed transaction databases 104b, 106b, 108b, and 110a, as is discussed below by creating (a.k.a., "mining") a distributed crypto currency, processing transactions involving the distributed crypto currency, and/or otherwise performing actions that provide the ledger 112. Further, in some embodiments, system provider device(s) 110 may be connected to the distributed group of devices 104, 106, and 106 via the network 120. In a specific example, the system provider device may be a payment service provider such as, for example, PayPal, Inc. of San Jose, Calif., which may utilize a payment service provider device 110 to perform authentication or verification of the method 300 discussed below, and in some embodiments may operate in cooperation with one or more other system providers (via their system provider devices), payees (via their payee devices), payers (via their payer devices), and/or users (via their user devices) to perform the method 200 discussed below. Alternatively, the verification of the method 300 may be performed by the distributed devices 104, 106, and 108 which have been previously verified by the system provider device 110. As is described more fully with respect to FIG. 2, each of the distributed devices 104, 106, and 108 has performed an authentication process which utilized the unique behavioral data 104a, 106a, and 108a which has been captured by the respective devices 104, 106, and 108.

As is described more fully below, the unique behavioral data 102a or a user device 102 requesting to act as a miner or participant in writing the block chain of the distributed ledger 112 is analyzed by other devices of the distributed system 100, including the system provider device 110 and/or the various previously verified devices 104a, 106a, and/or 108a. This analysis may involve identifying the existence or absence of a threshold of human characteristics or behavior and the comparison of the behavioral data 102a to the behavioral data 104a, 106a, 108a of other devices 104, 106, and 108 acting as miners of the block chain or to a behavioral template database 130 associated with the system provider device 110 to ensure that each user device is significantly associated with a single user who exhibits human behaviors and that no single user is attempting to participate with or write to the block chain using more than one device.

However, these embodiments are meant to be merely illustrative, and one of skill in the art in possession of the present disclosure will recognize that a wide variety of system providers may operate, alone or together, to provide the systems and methods discussed herein without departing from the scope of the present disclosure.

For example, the verified distributed ledger devices 104, 106, and 108 and/or system provider device 110 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 100, and/or accessible over the network 120.

The network 120 may be implemented as a single network or a combination of multiple networks. For example, in various embodiments, the network 120 may include the Internet and/or one or more intranets, landline networks, wireless networks, cellular networks, and/or other appropriate types of networks.

The verified distributed ledger devices 104, 106, and 108 may be implemented using any appropriate combination of hardware and/or software configured for wired and/or wireless communication over network 120. For example, in one embodiment, the verified distributed ledger devices 104, 106, and 108 may be implemented as mobile communication devices connected by the Internet. As such, verified distributed ledger devices 104, 106, and 108 may be a smart phone, wearable computing device, and/or other types of mobile computing devices.

The verified distributed ledger devices 104, 106, and 108 may include one or more browser applications which may be used, for example, to provide a convenient interface to permit the user to browse information available over the network 120. For example, in one embodiment, the browser application may be implemented as a web browser configured to view information available over the Internet.

The verified distributed ledger devices 104, 106, and 108 may also include one or more toolbar applications which may be used, for example, to provide user-side processing for performing particular tasks in response to operations selected by the user. In one embodiment, the toolbar application may display a user interface in connection with the browser application.

The verified distributed ledger devices 104, 106, and 108 may further include other applications as may be desired in particular embodiments to provide particular features to users. In particular, the other applications may include a payment application for payments assisted by a payment service provider. The other applications may also include security applications for implementing user-side security features, programmatic user applications for interfacing with appropriate application programming interfaces (APIs) over the network 120, or other types of applications. Email and/or text applications may also be included, which allow the user to send and receive emails and/or text messages through the network 120. The user devices verified distributed ledger devices 104, 106, and 108 include one or more user and/or device identifiers which may be implemented, for example, as operating system registry entries, cookies associated with the browser application, identifiers associated with hardware of the verified distributed ledger devices 104, 106, and 108, or other appropriate identifiers, such as a phone number. In one embodiment, the user identifier may be used to associate the user with a particular account as further described herein.

Figure 2:
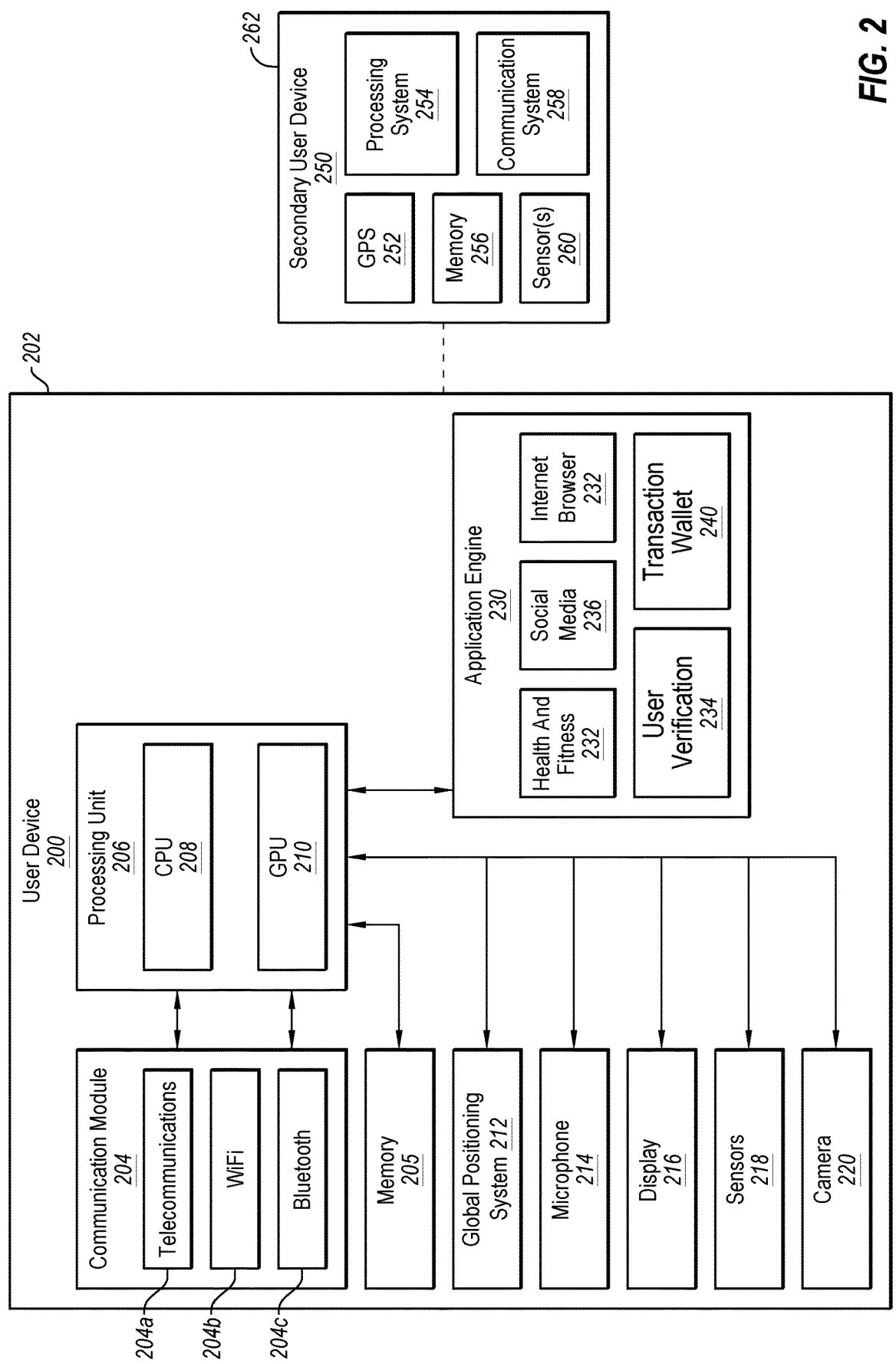
FIG. 2 is a block diagram illustrating a user device which may be used to collect behavior data of a user and request permission to participation in adding to the block chain of the distributed ledger system.

Referring now to FIG. 2, an embodiment of a user device 200 is illustrated that may be the user device 102 discussed above, and which may be provided by a mobile communication device such as a smart phone, smart watch, and/or other suitable mobile devices. It should be noted, that in addition to the specific components described below, the user device 102 may also include the components described above with respect to verified distributed ledger devices 104, 106, and 108.

In the illustrated embodiment, the user device 200 includes a chassis 202 that houses the components of the user device 200, only some of which are illustrated in FIG. 2. For example, the chassis 202 may house a communications module 204, processing unit 206, and a non-transitory memory system 205 that includes instructions that, when executed by the processing unit 206, cause the processing system 206, including a central processing unit (CPU) 208 and a graphics processing unit (GPU) 210 to provide an application engine 230 configured to perform the functions of a variety of different software applications.

The communications module 204 in the illustrated example includes a telecommunications module 204a configured for enabling communication with a communication network, such a cellular network, a WiFi transceiver/antenna 204b, and a Bluetooth module 204c. The user device 200 may also include a number of other components including a global position system (GPS) 212, a microphone 214, a display 216, sensors 218, and/or a camera 220, which may be used to capture behavioral or behavioral user data in association with the processing unit 206. The captured behavioral or behavioral user data may be stored in the memory 205 or may be further analyzed, aggregated, and organized by the software applications of the application engine 230.

In a specific example, the application engine 230 is configured to provide a health and fitness application 232 which collects and/or stores biometric data of a user as a type of behavioral user behavior. The health and fitness application 232 may store and/or collect a variety of behavioral data 102A in association with other components of the device, including the global positioning system (GPS) 212, and one or more of the sensors 218, potentially including an accelerometer or gyroscope. According to one embodiment, the heath and fitness application 232 may use the data collected by the GPS 212 and the sensors 218 to determine such behavioral data 102A as the number of steps a user has taken while holding or carrying the user device 200, the distance traveled by the user in a predetermined period, a particular path or route taken by a user, a speed or velocity at which a user travels while the user carries the user device 200.

In these or other embodiments, behavioral data 102A corresponding to the user's interaction with the user device 200 and the applications of the application engine 230 may be captured. For example, the frequency at which a user interacts with a social media application 236 or internet browser 238, the type of interaction, duration, content of the interaction, time of day at which the interaction(s) with the social media application 236 or internet browser 238 may be stored for further analysis as is described below. For example, a user's search history or browsing history of the internet browser 238 may be stored to determine the existence of human behaviors such as identifying behavioral use patterns which correspond to the use patterns of other users of the system 100 previously identified in the behavioral data 104a, 106a, and 108a of the previously verified distributed ledger devices 104, 106, 108 or stored in the behavioral template database 130 of the system provider device 110. Additionally or alternatively, a learning machine associated with the system provider device 110 may be used to perform tests on the behavioral data 102A of a user device 102 in order to determine whether the behavioral data 102A exhibits human behavior. For example, in some embodiments, the learning machine may be configured to perform a Turing test on the behavioral data 102A of a user device 102 in order to determine whether the behavioral data 102A exhibits human behavior.

Furthermore, a user verification application 234 may be used to collect behavioral data 102A, such as the existence of a unique user thumbprint and the frequency in which it is used to authenticate the user for using the user device 102. Similarly, the existence of a user passcode and the frequency at which it is used may also be collected. As was described above, in addition to the frequency and existence of user verification information, other data, such as the time of day at which a user tends to enter the passcode or perform a thumbprint, vocal, or facial verification may also be captured and stored for further analysis.

As may be understood, other behavioral data associated with the user's use or interaction with the user device 200 may also be captured as behavioral data, including, but not limited to the frequency, duration of phone calls are made and received, the number and frequency at which emails and text messages are sent and received. Furthermore, the user contacts stored in the user device 200 may also be used to identify human behavioral characteristics. Furthermore, the camera 220 and microphone 214 may be used to determine the frequency at which pictures or photos are taken by the user device 200, the content may be analyzed to identify human behavior, such as to identify a network of friends, family, pets, hobbies, and/or subjects in which the user has a particular interest.

In some instances, the user device 200 may be used in association with a secondary user device 250 which houses various components in a housing 262. In some instances, the secondary user device 250 may include a biometric collection device, such as a smartwatch. In this example, the secondary user device 250 may include a GPS 252 for determining a users' location, processing system 254 for causing the device 250 to perform a series of operations stored in a executable memory 256, a communication system 258 for communicating with the user device 200 or network 120. The secondary user device 250 also includes a series of sensors 260 which may include a heartrate monitor, an accelerometer, a gyroscope, an ambient temperature monitor, a blood-glucose monitor, a magnetometer, an oximetry sensor, skin conductance sensor, and or a skin temperature sensor. As may be understood, the secondary user device 250 may be used to collect additional biometric data which is subsequently transferred to the user device 200 and stored in the memory 205 as behavioral data 102A to identify human behaviors, such as a heartrate, breathing patterns, body temperature, blood-glucose levels, blood-oxygen levels, skin conductance and the like. Further, as may be understood, some of these sensors may be included as a sensor 218 of the primary user device 200.

Figure 3:
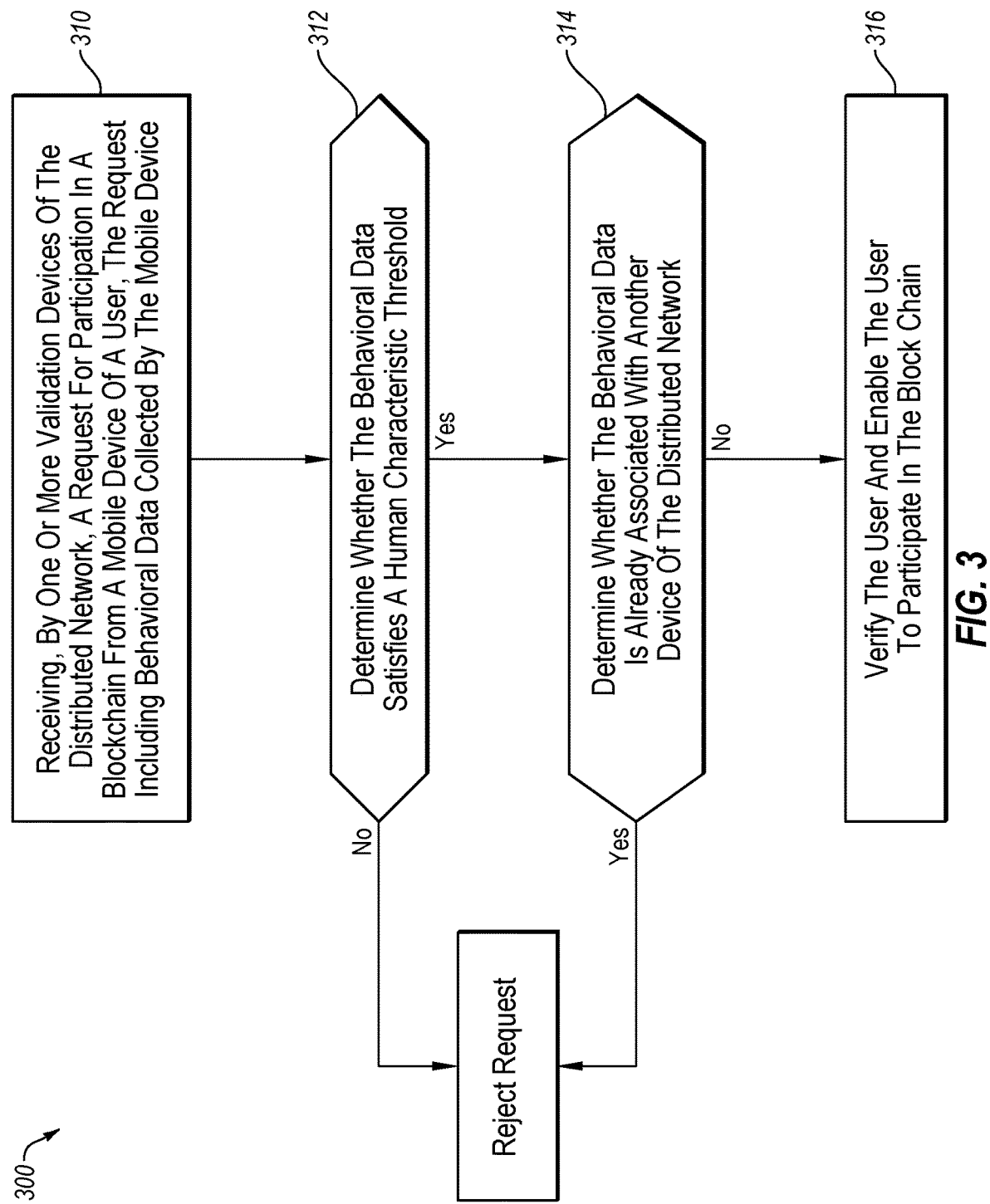
FIG. 3 is a flow chart illustrating a method for verifying a user to participate in a block chain of a distributed network.

The application engine 230 of the user device 200 also includes a transaction wallet application 240 which may be used to log the user into the distributed ledger system 100 and/or to store any transactional fees which the user may collect for participating in the block chain, In addition to the applications described above, one of skill in the art in possession of the present disclosure will recognize that other applications and computing device functionality may be enabled by the application Referring now to FIG. 3, a method 300 for validating a device 102 for participation in the distributed network system 100 is described. The method may include block 310, where one or more validation devices 104a, 106a, 108a, and 110 of the distributed network 100 receive a request for participation in a block chain ledger 112 of the distributed network 100 from a mobile device 102 of a user. The request includes behavioral data 102A collected by and/or stored by the mobile device 102.

In one embodiment, the behavioral data 102A is analyzed by the system provider device 110 to determine at block 312 whether the behavioral data satisfies a human characteristic threshold. As was briefly described above, this may include performing analyzing the behavioral data 102A to identify human characteristics, such as typical movement patterns, biometric patterns, social media behaviors, typical user interactions with user devices, including frequency type of interaction and the like to perform a Turing test style determination or "proof-of-life" determination which ensures that human user is interacting with and associated with the user device 102. This may include comparing the behavioral data 102A with a behavioral template database 130. For example, the behavioral data 102A may be identified to identify user sleep patterns, device lock/unlock patterns, movement patterns, the existence of a social network, user behavioral patterns corresponding to typical human interactions with similar social media applications, internet browsers, components of user devices, and the like.

As may be understood, this may include analyzing multiple data points from various sources, such as identifying the number of steps a user is deemed to have walked in a single day with standard heart rate patterns and standard interactions with a social media application. If it is determined that the behavior does not correspond with typical human behaviors, such as being too predictably periodic, repetitive, or generally incongruent, the system provider device 110 may determine that the user device 102 has failed the "proof-of-life" test and no mining or participation rights of the ledger 112 are given to the user device 102.

In response to determining that the behavioral data 102A satisfies a human characteristic threshold at block 312, the system provider device 110 determines at block 314 that the behavioral data 102A is not associated with another device 104A, 106A, and 108A of the distributed network system 100. As was previously described, one benefit of the distributed network system 100 described herein is to assign equal participation or mining/hashing rights to the users of the distributed network system 100. In order to ensure that a user is not using multiple devices to access the distributed network system 100 to obtain a disproportionate amount of mining/hashing rights, the system provider device 110 may compare the behavioral data 102A with the behavioral data 104A, 106A, and 108A of other validated devices 104, 106, and 108, which may be stored in the behavioral template database 130 as a series of profiles. In some instances, this may include analyzing behavioral data 104A, 106A, and 108A to identify duplicative data, which may include digital fingerprint data, facial recognition, social media login and password information, credit card or banking information, billing address, and the like.

In the instance where it is determined that the behavioral data 102A is determined to contain duplicative data to another device 104A, 106A, or 108A, the user device 102 is flagged as being a duplicative device and a series of additional proof-of-life tests may be required and successfully satisfied before the user device 102 is able to participate in the system 100.

In response to determining that the behavioral data 102A is not associated with another device 104, 106, and 108 of the distributed network system 100, the method 300 may proceed to block 316 at which the user device 102 is verified for participation in the block chain of the ledger 112 and is given an equal share of hashing and mining privileges.

In the embodiment described above, the verification of user device 102 is performed by the system provider device 100 in association with the behavioral template database 130. In another embodiment, the verification of the user device 102 may be performed by one or more verified distributed ledger device 104, 106, and 108. According to this embodiment, this may involve requesting that a hashing operation is performed on any personal or sensitive information of a user's behavioral information, such as login information, password/passcode information, digital thumbprint, facial recognition, or the like. Such a hashing would ensure that no identifying or sensitive information is transmitted to the verified distributed ledger devices 104, 106, and 108, but should duplicate information be transmitted to the verified distributed ledger devices from another device, the other distributed ledger devices 104, 106, and 108 would receive duplicative hash values indicating duplicative data. In addition, information transmitted to and from the verified distributed ledger devices 104, 106, and 108 may be encrypted so as to ensure the security of any information which is transmitted.

In the embodiment described above, the method 300 is described as being performed during an initial verification process for verifying a user of the user device 102 for participation in the block chain ledger 112 of the distributed network 100. As may be understood, this verification process may not be performed only during the initial verification and may be required to be performed periodically by each of the verified distributed ledger devices 104, 106, and 108. For example, each user account may require a "proof-of-life" verification each predetermined number of hours, such as each "24" hours, wherein the behavioral data 104a, 106a, 108a of each respective device is transmitted to other validation device(s) 102, 104, 106, 108, and/or 110 of the distributed network 100 for periodic verification.

In the embodiments described above, a single user device 102 is described as acting as a verified device capable of participating in the block chain to write further blocks to the ledger 112 as is described more fully below. In another embodiment, a single user may elect to associate more than one user device 102 with their user account. In such configurations, a user may use his or her mobile communication device, such as a smartphone, to supply the behavioral data required to show the initial and periodic "proof-of-life" as is described above, but may elect to have the mining or hashing performed by another device, such as a laptop computer, tablet, desktop computer, or other computing device. As such, the user may then transfer the mining process to a secondary device, while using a primary mobile device 102 to capture and/or store the behavioral data 102a which is used to establish the human characteristics required to maintain participation in the block chain distributed network 100. This embodiment still maintains the same amount of mining or voting privilege per human operator, while providing users with the system the ability to distribute the processing and connectivity requirements of the system according to their personal needs. For example, a desktop computer and a mobile device together may act as an aggregated verified distributed ledger device 104, wherein the mobile device is periodically connected to the network 120 to establish proof-of-life by submitting behavioral data 104a collected and stored on the device for verification by the other verified devices 106, 108, and 110 of the system 100, whereas a desktop or laptop computer is constantly connected to the network 120 to participate as a verified miner which is able to add transaction records to the block chain of the ledger 112.

Figure 4:
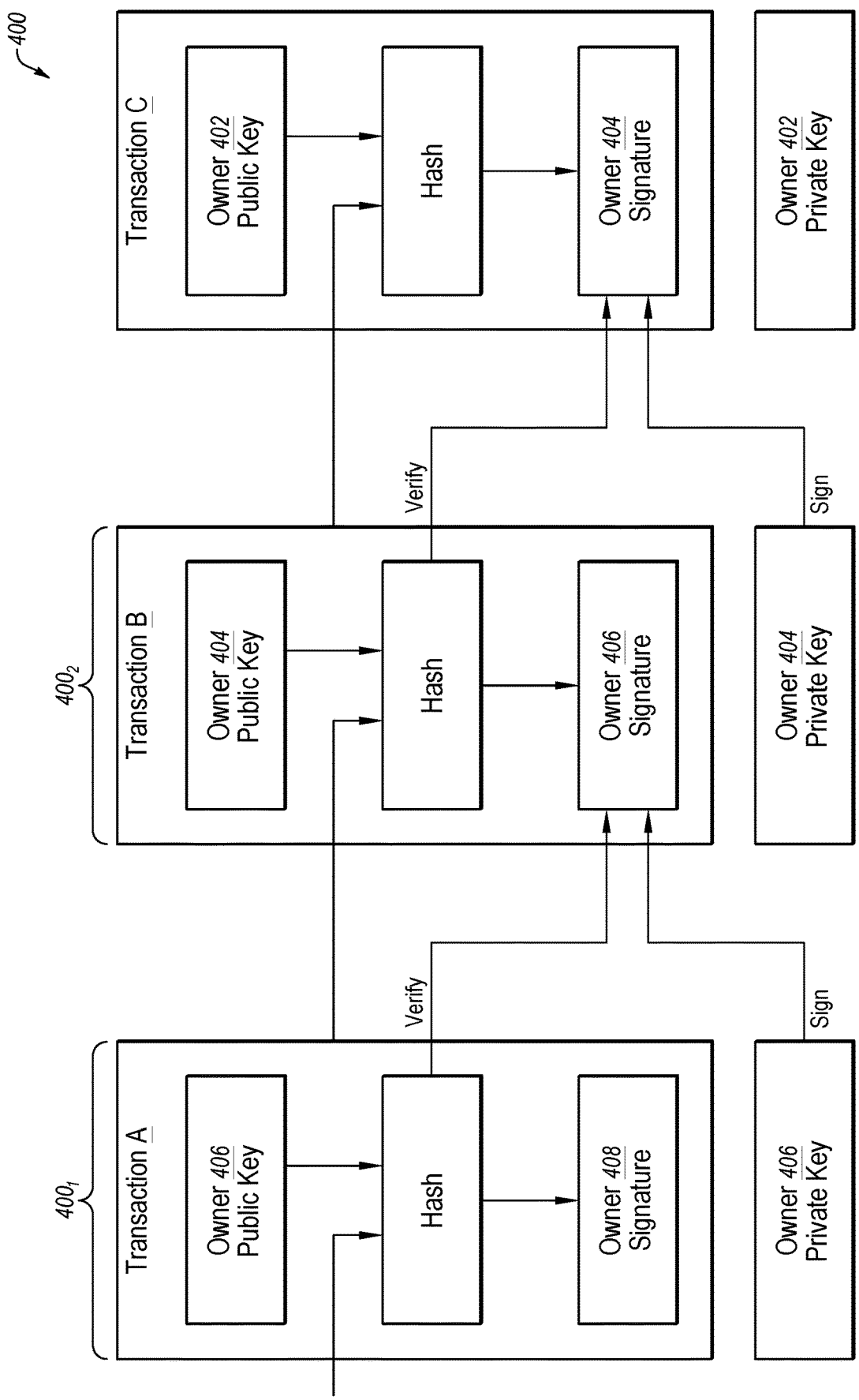
FIG. 4 is a schematic view illustrating an embodiment of an electric coin or authentication token.
Figure 5:
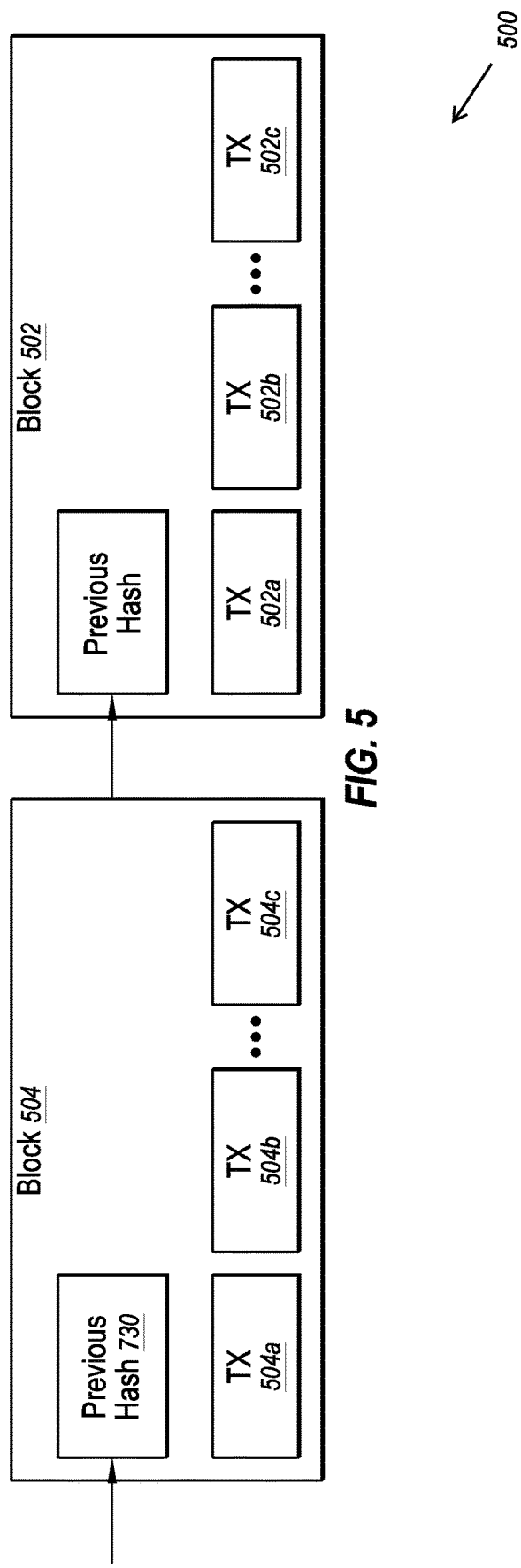
FIG. 5 is a schematic view illustrating an embodiment of a distributed ledger.

Referring now to FIG. 4, an embodiment of an electronic coin 400 is illustrated and described briefly for reference to the distributed ledger 112 used in some embodiments of the method 300 discussed above. In those embodiments, a crypto currency system associated with the present disclosure defines an electronic coin as a chain of digital signatures provided by previous owners of the electronic coin to subsequent owners of the electronic coin. In the illustrated embodiment, the electronic coin 400 is owned by an owner 402, and FIG. 5 illustrates how the electronic coin 400 is defined by the digital signatures of the previous owners 404, 406, and 408. Specifically, in transaction A, a hash of the public key of owner 406 (i.e., the owner receiving, as a result of transaction A, an electronic coin $400_1$ defined by digital signatures provided up to transaction A) and the previous transaction (not illustrated, but occurring prior to transaction A) was signed by owner 408 (i.e., the owner providing, as a result of transaction A, the electronic coin $400_1$ defined by digital signatures provided up to transaction A) and added to an initial electronic coin (which was defined by digital signatures provided up to the transaction prior to transaction A) such that the electronic coin 400 1 was transferred to owner 406.

Similarly, in transaction B, a hash of the public key of owner 404 (i.e., the owner receiving, as a result of transaction B, an electronic coin $400_2$ defined by digital signatures provided up to transaction B) and transaction A was signed by owner 406 and added to the electronic coin $400_1$ such that the electronic coin $400_2$ was transferred to owner 404. Similarly, in transaction C, a hash of the public key of owner 402 (i.e., the owner receiving, as a result of transaction C, the electronic coin 400 defined by digital signatures provided up to transaction C) and the transaction B was signed by owner 404 and added to the electronic coin $400_2$ such that the electronic coin 400 was transferred to owner 402. As may be understood, any payee receiving an electronic coin (e.g., owner 406 in transaction A, owner 404 in transaction B, and owner 402 in transaction C) can verify the signatures to verify the chain of ownership of the electronic coin. In the discussion below, it should be understood that the term "electronic coins" is used to encompass any amount of electronic coins, and in the embodiments discussed below will typically by small fractions of a coin (e.g., 0.00000001 electronic coins) or some amount of a coin with relatively low value.

FIG. 5 is an embodiment of a crypto currency ledger 500, which is illustrated and described briefly for reference to the distributed ledger 112 used in some embodiments of the method 300 discussed above. More particularly, once the user device 102 has been validated as a participating miner in the distributed ledger system 100, the embodiment of FIG. 5 illustrates how the user device 102 and verified distributed ledger devices 104, 106, and 108 operate. Conventionally, the crypto currency ledger 500 operates to verify that payers transferring an electronic coin (e.g., referring back to FIG. 1, owner 106 in transaction A, owner 104 in transaction B, and owner 102 in transaction C) did not "double-spend" (e.g., sign any previous transactions involving) that electronic coin. To produce the crypto currency distributed ledger 400, the distributed network of devices 104, 106, 108, (and 102, if validated), operate to agree on a single history of transactions in the order in which they were received such that it may be determined that a transaction between a payer and a payee using an electronic coin is the first transaction associated with that electronic coin. Each device 104, 106, and 108 in the distributed network operates collect new transactions into a block.

For example, for a block 502 that includes a number of transactions 502a, 502b, and up to 502c, a device 104, 106, and 108 in the distributed network system 100 may each indicate their availability to "chain" the block 502 to the previous block 504. This may involve the initial or periodic verification of human behavior such as described above. A previous hash of the block 402 may operate as a selection algorithm for selecting which of the devices 104, 106, and 108 is selected to chain the block 502 to the previous block 504.

Figure 6:
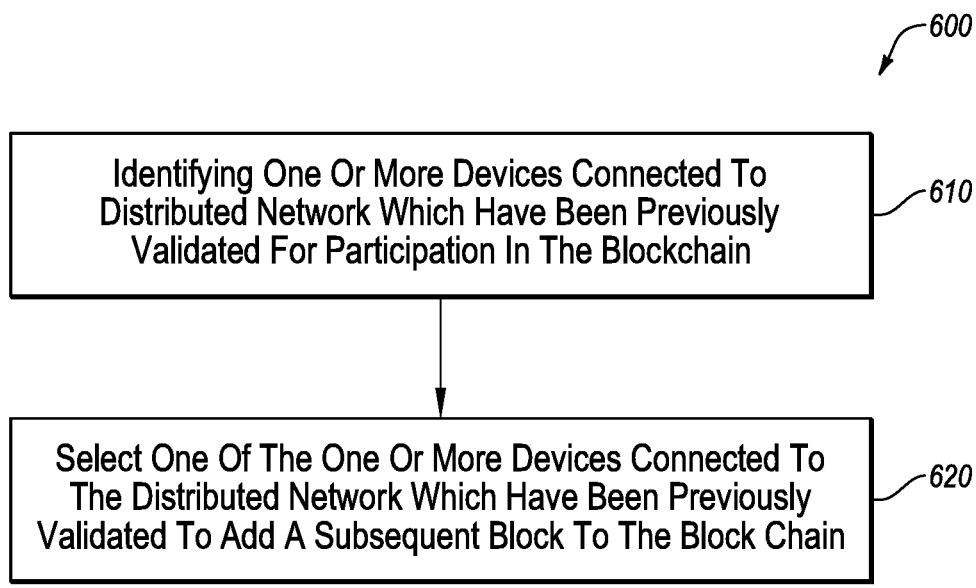
FIG. 6 is a flow chart illustrating a method for selecting one of the one or more devices in the distributed network to add a block to the block chain of a distributed network.

FIG. 6 is a block diagram illustrating the method 600 for selecting a device for chaining block 502 to the block chain 504. At 610, one or more devices connected to the distributed network which have been previously validated for participation in the block chain are identified. At 620, one of the previously validated one or more devices connected to the distributed network are selected to add a subsequent block to the block chain.

Pursuant to the selection 620, a selection algorithm or mechanism may be used for selecting a device 104, 106, and 108. One example of a suitable mechanism for selecting a particular device 104, 106, and 108, includes a request for the period of time to which a user device 104, 106, or 108 has been connected to the distributed network system 100, such that the device 104, 106, and 108 which returns a response with the greatest value is selected and may then "chain" the block 502 to the previous block 504 (which may have been "chained" to a previous block, not illustrated, in the same manner). Alternatively, the selection may be performed based on a random number hash, such that if a random number n is selected, the nth device requesting permission to chain block 502 is granted permission. In another configuration, a combination of these two mechanisms may be used and/or a weighting operation such that the length to which a device 104, 106, and 108 is connected one criteria with randomization also playing a factor, such as selecting a random device from a subset of devices which have been connected to the system 100 for more than a predetermined period of time without being selected to add a block to the block chain. Other weighting factors may be used, such as the amount of time a user has been participating as a miner in the system overall, the amount of time since a user has last been granted permission to add a block to block chain, the number of previous blocks the user has written to the block chain, and/or any other variety of mechanisms. As such, a number of other means may be used to select a particular device 104, 106, or 108 for performing the chaining or mining operation.

In some instances, the newly written block (e.g., block 502) is then broadcast to the distributed network system 100, and other devices 104, 106, and 108 in the distributed network 100 will accept that block if all the transactions in it are valid and not already spent (which may be determined by creating the next block using the hash of the accepted block 502). Additionally, in some types of implementations, the distributed ledger system 100 will always consider the longest chain of blocks to be the correct one, and will operate to continue to extend it. If a device receives two different versions of a block, it will work on the first block received, but save the second block received in case the branch of the chain that includes the second block becomes longer (at which point that device with switch to working on the branch of the chain that includes the second block).

In another embodiment, the amount of total "life" of a block or how long each participant device 104, 106, and 108 of participating in a block chain have been connected to the network 120 and validated as exhibiting human behavior may be used to determine which is the correct block. In this example, a sum total of "life of the block" of all the participating devices 104, 106, and 108 may be calculated and used to determine which chain of blocks is determined to be the correct one. As such, the block which has been determined to have established the greatest "proof of life" will be distributed and extended by the rest of the system 100.

Conventionally, the electronic coin(s) 400 and crypto currency public ledger 500 discussed above provide a distributed crypto currency system in which payers and payees may participate in transactions with each other using the electronic coins discussed above and without the need for a centralized authority such as a bank. Each of those transactions is recorded in the crypto currency public ledger 112 to ensure that the electronic coins may only be spent by a payer once.

In addition to using digital currency stored in transaction wallet 240 of each device to perform transactions, according to some embodiments, a verified distributed ledger device 104, 106, and 108 may receive a transaction reward for participating in the distributed ledger 112. As such, upon writing a block to the block chain, a device may receive a transaction reward in the form of digital currency being added to the transaction wallet of the corresponding device 104, 106, and 108.

In addition to the crypto currency system described above, the distributed ledger need not necessarily be associated with a crypto currency system, or in other manners that would be apparent to one of skill in the art in possession of the present disclosure. For example, one or more system provider devices 110 and/or verified ledger devices 104, 106, and 108 coupled together through the network 120 may operate to agree on a single history of transactions (e.g., crypto currency transactions, authentication transactions, etc.) in a ledger 112 that may be stored on respective transaction databases 104a and 106a that are accessible by those system provider device(s) 104 and 106, respectively.

Thus, systems and methods have been described that provide for the verification of a user for participation in a block chain of a distributed network using behavioral data collected and stored on a mobile communication device. The systems and methods provide for distributed block chain ledger which ensures democracy and equal hashing power amongst users by associating mining and voting rights with the unique user behaviors of the user operating the mobile communication device. The systems and methods eliminate the "proof-of-work" system described in the block chain participation of previous distributed networks. This eliminates unnecessarily processing and computing by the devices of the system and provides a more robust system which is better equipped to eliminate 51% attacks.

Figure 7:
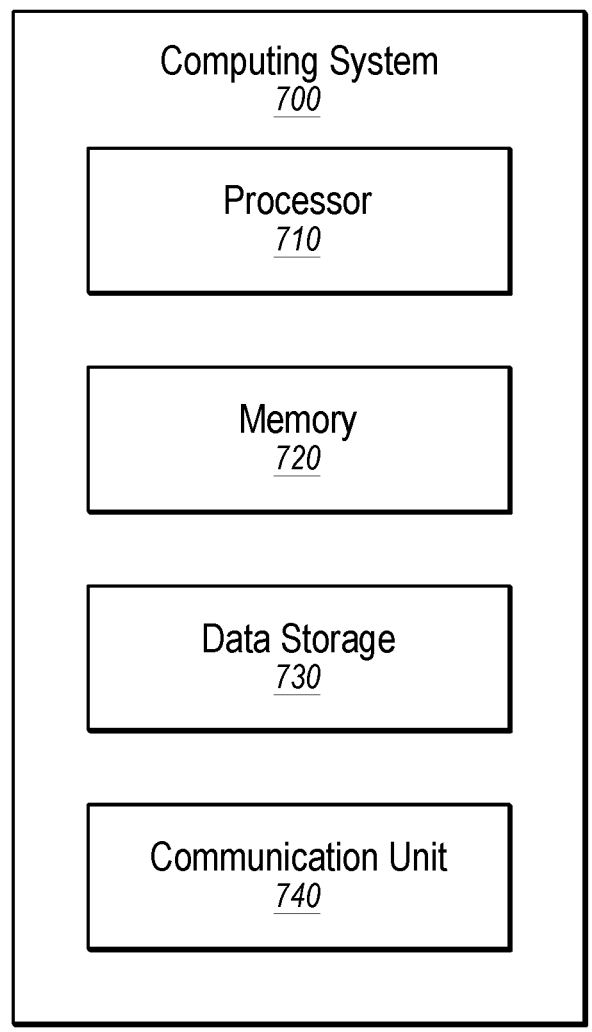
FIG. 7 illustrates an example computing system that may be used in a system configured to provide payments initiated in an augmented reality device.

Referring now to FIG. 7, an embodiment of a computer system 700 suitable for implementing, for example, the user device 102, verified distributed ledger devices 104, 106, and 108, and/or system provider device 110, is illustrated. It should be appreciated the components described below may be used in association with the components described above with respect to FIGS. 1 and 2.

In association with the embodiments described herein, FIG. 7 more particularly illustrates an example computing system 700 ("system 700") that may be used in accordance with one or more embodiments of the present disclosure and may be used in addition to the components of user device 102, verified distributed ledger devices 104, 106, and 108, and the system provider device 110 described above. Generally, the processor 710 may be the processing unit 206 of FIG. 2 and may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (SIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of networks or physical locations that are configured to perform individually or collectively any number of operations described herein. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions. In these and other embodiments, the payment processing steps of the methods described herein may be stored in the memory 720 and/or the data storage 730 and may be loaded and executed by the processor 710 to perform operations with respect to proof-of-life verification such as described above.

The memory 720 and the data storage 730 may include computer-readable storage media or one or more computer-readable storage media for carrying or having computer-executable instructions or data structures stored thereon. Such computer-readable storage media may include any available media that may be accessed by a general-purpose or special-purpose computer, such as the processor 710. By way of example, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform or control performance of a certain operation or group of operations as described in this disclosure.

The communication device 740 may include any component, device, system, or combination thereof that is configured to transmit or receive information over a network. In some embodiments, the communication device 740 may communicate with other devices at other locations, the same location, or even other components within the same system. For example, the communication device 740 may include a modem, a network card (wireless or wired), an infrared communication device, a wireless communication device (such as an antenna), and/or chipset (such as a Bluetooth device, near-field communication (NFC) device, an 802.6 device (e.g., Metropolitan Area Network (MAN)), a WiFi device, a WiMax device, cellular communication facilities, etc.), and/or the like. The communication device 740 may permit data to be exchanged with a network and/or any other suitable devices or systems, such as those described in the present disclosure. For example, when the system 700 is included in the devices 110, 102, 104, 106, and/or 108 of FIG. 1, the communication device 740 may allow the devices 110, 102, 104, 106, and/or 108 to communicate with one or more other devices over the network 120 of FIG. 1 and/or other communication avenues.

One skilled in the art, after reviewing this disclosure, may recognize that modifications, additions, or omissions may be made to the system 700 without departing from the scope of the present disclosure. For example, the system 700 may include more or fewer components than those explicitly illustrated and described.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
   receiving a request for a user of a mobile communication device to add a new block to a block chain of a distributed network, wherein the request includes first behavioral data, collected by the mobile communication device, that corresponds to interactions by the user with the mobile communication device;
   determining, by a computer system based on the first behavioral data, that the interactions with the mobile communication device are consistent with the user being a human user, including by:
      analyzing the first behavioral data to identify one or more human characteristics indicative of a manner in which the user interacts with the mobile communication device;
   determining, by the computer system based on the first behavioral data, that the user is not associated with one or more other devices of existing participants in the block chain, including by:
      verifying that the first behavioral data collected by the mobile communication device of the user does not match behavioral data collected by the one or more other devices of the existing participants; and
   in response to the determining that the user is not associated with the one or more other devices of the distributed network, verifying, by the computer system, the user to add the new block to the block chain.

2. The method of claim 1, wherein the first behavioral data includes motion data corresponding movement of the mobile communication device.

3. The method of claim 2, wherein the motion data includes data indicative of at least one of:
   a number of steps taken by the user;
   a number of stairs climbed by the user;
   distance traveled over a predetermined period of time; or
   a rate of movement of the mobile communication device.

4. The method of claim 1, wherein the first behavioral data includes biometric data corresponding to the user.

5. The method of claim 1, wherein the first behavioral data includes information corresponding to a location of the mobile communication device over a period of time.

6. The method of claim 1, wherein the first behavioral data includes data indicating a frequency with which the user interacts with one or more applications stored on the mobile communication device.

7. The method of claim 1, wherein the distributed network includes a plurality of different mobile communication devices acting as nodes of the block chain distributed network.

8. The method of claim 1, wherein the request is received by one or more validation device of the distributed network from the mobile communication device.

9. The method of claim 1, wherein the first behavioral data includes an encoded value corresponding to one or more items of sensitive information corresponding to the user, and wherein the verifying includes comparing the encoded value to a set of encoded values generated by the one or more other devices of the existing participants in the block chain.

10. The method of claim 9, wherein the encoded value is a hash value generated based on the one or more items of sensitive information; and wherein the one or more items of sensitive information corresponding to the user include at least one of:
    a password of the user;
    a facial recognition scan of the user; or
    a digital thumbprint of the user.

11. A system, comprising:
    at least one processor;
    a non-transitory, computer-readable medium having instructions stored thereon that are executable by the at least one processor to cause the system to:
       receive a request for a user of a mobile communication device to add a new block to a block chain of a distributed network, wherein the request includes first behavioral data, collected by the mobile communication device, that corresponds to interactions by the user with the mobile communication device;
       determine, based on the first behavioral data, that the interactions with the mobile communication device are consistent with the user being a human user, including by:
          analyzing the first behavioral data to identify one or more human characteristics indicative of a manner in which the user interacts with the mobile communication device;
       determine, based on the first behavioral data, that the user is not associated with one or more other devices of existing participants in the block chain, including by:
          verifying that the first behavioral data collected by the mobile communication device of the user does not match behavioral data collected by the one or more other devices of the existing participants; and
       in response to determining that the user is not associated with the one or more other devices of the distributed network, verify the user to add the new block to the block chain.

12. The system of claim 11, wherein the first behavioral data includes motion data corresponding movement of the mobile communication device.

13. The system of claim 11, wherein the first behavioral data includes biometric data corresponding to the user.

14. The system of claim 11, wherein the first behavioral data includes data indicating a frequency with which the user interacts with one or more applications stored on the mobile communication device.

15. The system of claim 11, wherein the instructions are further executable to cause the system to:
    receive a second request for a second user to add a second new block to the block chain of the distributed network, wherein the second request includes second behavioral data, collected by a second mobile communication device of the second user, that corresponds to interactions by the second user with the second mobile communication device; and
    in response to a determination, based on the second behavioral data, that the second user is already associated with at least one of the one or more other devices of the existing participants in the block chain, reject the second request.

16. A non-transitory, machine-readable medium having instructions stored thereon that are executable by a system to perform operations comprising:
  receiving a request for a user of a mobile communication device to add a new block to a block chain of a distributed network, wherein the request includes first behavioral data, collected by the mobile communication device, that corresponds to interactions by the user with the mobile communication device;
  determining, based on the first behavioral data, that the interactions with the mobile communication device are consistent with the user being a human user, including by:
    analyzing the first behavioral data to identify one or more human characteristics indicative of a manner in which the user interacts with the mobile communication device;
  determining, based on the first behavioral data, that the user is not associated with one or more other devices of existing participants in the block chain, including by:
    verifying that the first behavioral data collected by the mobile communication device of the user does not match behavioral data collected by the one or more other devices of the existing participants; and
  in response to the determining that the user is not associated with the one or more other devices of the distributed network, verifying the user to add the new block to the block chain.

17. The non-transitory, machine-readable medium of claim 16, wherein the first behavioral data includes information indicative of a frequency with which the user provides user verification information to the mobile communication device.

18. The non-transitory, machine-readable medium of claim 17, wherein the first behavioral data includes one or more biometrics of the user.

19. The non-transitory, machine-readable medium of claim 16, wherein the first behavioral data includes movement information indicative of a route traveled by the user of the mobile communication device.

20. The non-transitory, machine-readable medium of claim 16, wherein the first behavioral data includes data indicating a duration for which, during a particular time period, the user interacts with one or more applications stored on the mobile communication device.

* * * * *